(12) United States Patent
Luo et al.

(10) Patent No.: US 11,965,103 B2
(45) Date of Patent: Apr. 23, 2024

(54) ADDITIVE MANUFACTURING OF POLISHING PADS

(71) Applicant: Applied Materials, Inc., Santa Clara, CA (US)

(72) Inventors: Yingdong Luo, San Jose, CA (US); Sivapackia Ganapathiappan, Los Altos, CA (US); Ashwin Murugappan Chockalingam, San Jose, CA (US); Daihua Zhang, Los Altos, CA (US); Uma Sridhar, Sunnyvale, CA (US); Daniel Redfield, Morgan Hill, CA (US); Rajeev Bajaj, Fremont, CA (US); Nag B. Patibandla, Pleasanton, CA (US); Hou T. Ng, Campbell, CA (US); Sudhakar Madhusoodhanan, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 919 days.

(21) Appl. No.: 16/996,744

(22) Filed: Aug. 18, 2020

(65) Prior Publication Data
US 2021/0054222 A1 Feb. 25, 2021

Related U.S. Application Data

(60) Provisional application No. 62/890,019, filed on Aug. 21, 2019.

(51) Int. Cl.
*C09D 11/107* (2014.01)
*B24B 37/24* (2012.01)
(Continued)

(52) U.S. Cl.
CPC .......... *C09D 11/107* (2013.01); *B24B 37/245* (2013.01); *B29C 64/112* (2017.08);
(Continued)

(58) Field of Classification Search
CPC ..... B24B 37/245; B24B 37/24; B29C 64/112; B29K 2033/08; B33Y 10/00; B33Y 70/10; B33Y 80/00
See application file for complete search history.

(56) References Cited

U.S. PATENT DOCUMENTS

| 5,197,999 A | 3/1993 | Thomas |
| 8,480,203 B2 | 7/2013 | Van Thillo et al. |

(Continued)

FOREIGN PATENT DOCUMENTS

| CN | 104710573 | 6/2015 |
| CN | 105706217 | 6/2016 |

(Continued)

OTHER PUBLICATIONS

PCT International Search Report and Written Opinion in International Appln. No. PCT/US2020/046840, dated Nov. 30, 2020, 9 pages.

(Continued)

*Primary Examiner* — Pegah Parvini
(74) *Attorney, Agent, or Firm* — Fish & Richardson P.C.

(57) ABSTRACT

A formulation, system, and method for additive manufacturing of a polishing pad. The formulation includes monomer, dispersant, and nanoparticles. A method of preparing the formulation includes adding a dispersant that is a polyester derivative to monomer, adding metal-oxide nanoparticles to the monomer, and subjecting the monomer having the nanoparticles and dispersant to sonication to disperse the nanoparticles in the monomer.

16 Claims, 9 Drawing Sheets

(51) Int. Cl.
    *B29C 64/112*     (2017.01)
    *B29K 33/00*      (2006.01)
    *B29K 509/02*     (2006.01)
    *B29L 31/00*      (2006.01)
    *B33Y 10/00*      (2015.01)
    *B33Y 40/10*      (2020.01)
    *B33Y 70/10*      (2020.01)
    *B33Y 80/00*      (2015.01)
    *C09K 3/14*       (2006.01)

(52) U.S. Cl.
    CPC ............... *B33Y 10/00* (2014.12); *B33Y 40/10* (2020.01); *B33Y 70/10* (2020.01); *B33Y 80/00* (2014.12); *C09K 3/1409* (2013.01); *B29K 2033/08* (2013.01); *B29K 2509/02* (2013.01); *B29L 2031/736* (2013.01)

(56) References Cited

U.S. PATENT DOCUMENTS

| | | | |
|---|---|---|---|
| 9,744,724 | B2 | 8/2017 | Bajaj et al. |
| 2004/0145088 | A1 | 7/2004 | Patel et al. |
| 2005/0020082 | A1 | 1/2005 | Vishwanathan et al. |
| 2007/0259986 | A1 | 11/2007 | Elwakil et al. |
| 2009/0181539 | A1 | 7/2009 | Kon et al. |
| 2010/0323050 | A1 | 12/2010 | Kumagai et al. |
| 2013/0283700 | A1 | 10/2013 | Bajaj et al. |
| 2015/0126099 | A1 | 5/2015 | Krishnan |
| 2016/0114458 | A1* | 4/2016 | Bajaj .................. B24B 37/22 51/298 |
| 2016/0176021 | A1 | 6/2016 | Orilall et al. |
| 2017/0100817 | A1 | 4/2017 | Ganapathiappan et al. |
| 2017/0203406 | A1* | 7/2017 | Ganapathiappan .... B33Y 10/00 |
| 2018/0050495 | A1 | 2/2018 | Stolyarov et al. |
| 2018/0297174 | A1 | 10/2018 | Krishnan et al. |
| 2019/0030678 | A1 | 1/2019 | Kumar et al. |

FOREIGN PATENT DOCUMENTS

| | | |
|---|---|---|
| CN | 106944619 | 7/2017 |
| CN | 105943406 | 11/2019 |
| JP | 2011162661 | 8/2011 |
| JP | 2007154175 | 6/2017 |
| JP | 2017533105 | 11/2017 |
| JP | 2018533487 | 11/2018 |
| JP | 2019099748 | 6/2019 |
| KR | 10-2018-0113714 | 10/2018 |
| WO | WO 2008032681 | 3/2008 |
| WO | WO 2009/098509 | 8/2009 |
| WO | WO 2016060857 | 4/2017 |
| WO | WO 2017066077 | 4/2017 |

OTHER PUBLICATIONS

Office Action in Chinese Appln No. 202080069546.6, dated Jun. 27, 2023, 15 pages (with English translation).

Office Action in Japanese Appln No. 2022511243, dated Jun. 26, 2023, 11 pages (with English translation).

Office Action in Taiwanese Appln. No. 109128202, dated Jun. 3, 2021, 7 pages (with English translation).

Office Action in Singapore Appln. No. 11202201486P, dated Sep. 4, 2023, 10 pages.

* cited by examiner

_US 11,965,103 B2_

ADDITIVE MANUFACTURING OF POLISHING PADS

CROSS-REFERENCE TO RELATED APPLICATIONS

This application claims priority to U.S. Application Ser. No. 62/890,019, filed on Aug. 21, 2019, the disclosure of which is incorporated by reference.

TECHNICAL FIELD

This disclosure relates to nanoparticle formulations for additive manufacturing of polishing pads utilized in chemical mechanical polishing.

BACKGROUND

An integrated circuit is typically formed on a substrate by the sequential deposition of conductive, semiconductive, or insulative layers on a silicon wafer. A variety of fabrication techniques employ planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted technique of planarization. In application, this planarization technique may mount the substrate on a carrier head. The exposed surface of the substrate is typically placed against a rotating polishing pad. The carrier head provides a controllable load on the substrate to push the substrate against the polishing pad. A polishing liquid, such as slurry with abrasive particles, may be supplied to the surface of the polishing pad. The CMP may be a result of a combination of mechanical force and chemical reactions. In addition to planarization, polishing pads can be used for finishing operations such as buffing. CMP may be a wafer or chip planarization in fabrication of integrated circuits (e.g., high-density integrated circuits).

Polishing pads for CMP may include "standard" pads and fixed-abrasive pads. A standard pad may have a polyurethane polishing layer with a durable roughened surface, and can also include a compressible backing layer. In contrast, a fixed-abrasive pad has abrasive particles held in a containment media, and can be supported on a generally incompressible backing layer.

Polishing pads are typically made by molding, casting, or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

SUMMARY

An aspect relates to a formulation for three dimensional (3D) printing of a polishing layer of a polishing pad. The formulation includes a parent formulation having monomer and nanoparticles dispersed in the parent formulation. The parent formulation includes a dispersant that is a polyester derivative.

Another aspect relates to a method of preparing a formulation for additive manufacturing of a polishing pad. The method includes adding a dispersant that is a polyester derivative to monomer, adding metal-oxide nanoparticles to the monomer, and subjecting the monomer having the nanoparticles and dispersant to sonication to disperse the nanoparticles in the monomer.

Yet another aspect relates to a method of fabricating a polishing pad. The method includes ejecting droplets of a formulation via a 3D printer to form a polishing layer of the polishing pad. The formulation includes monomer, nanoparticles dispersed in the monomer, and a dispersant that is a polyester derivative. The method includes polymerizing the monomer as ejected to form the polishing layer, wherein the polishing layer includes the nanoparticles.

The details of one or more implementations are set forth in the accompanying drawings and the description below. Other features and advantages will be apparent from the description and drawings, and from the claims.

BRIEF DESCRIPTION OF DRAWINGS

Like reference numerals in the various drawings indicate like elements.

DETAILED DESCRIPTION

Figure 1A:
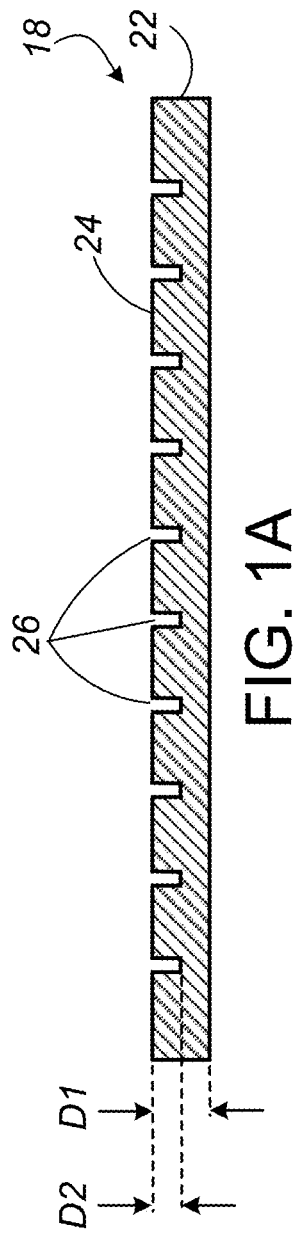
FIG. 1A is a schematic cross-sectional side view of an example polishing pad.

As indicated, the material layer of a substrate to be planarized is polished by a polishing pad in CMP. The polishing may involve a polishing fluid and abrasive particles. When abrasive particles are suspended in the polish fluid (slurry), a nonabrasive polishing pad is typically employed. The pad may transport the abrasive particles to the material layer of the substrate where the abrasive particles provide mechanical action with the material layer or surface of the substrate. In some slurry compositions, the abrasive particles may chemically react with the material layer or surface of the substrate.

When abrasive particles are not in the polish fluid, a fixed abrasive polishing pad may be employed. The abrasive particles are typically integrated into the polishing pad by embedding the particles in a supporting material (e.g., often referred to as a binder material or matrix), such as an epoxy resin. Generally, during CMP, the binder material may hold the abrasive particles in polishing pad. The particles provide mechanical polishing action on the material layer of the substrate during CMP. In some pad compositions, the abrasive particles in the polishing pad may chemically react with the material layer of the substrate. Moreover, abrasive particles may be released from the polishing pad as the polishing pad is worn in the polishing of the substrate.

Problems associated with fabrication of the polishing pads have included inadequate dispersion and low loadings of abrasive particles in formulations used to form the polishing pads. Moreover, the length of time to adequately disperse nanoparticles as abrasive particles in the formulation by sonication can be excessive. In contrast, as discussed below, present examples employ a dispersant to facilitate increased dispersion and loadings of nanoparticles in the formulation and decrease the length of time of sonication to disperse the nanoparticles.

In present implementations, nanoparticles may be dispersed into a three dimensional (3D) printing formulation. The polishing pad may be formed via 3D printing from the formulation having the dispersed nanoparticles. Therefore, the formed polishing pad has nanoparticles that can interact with the material layer of the substrate during CMP.

In particular, a formulation for 3D printing of a polishing layer of a polishing pad includes monomer, nanoparticles, and a dispersant that is a polyester derivative. The formulation is subjected to sonication to disperse the nanoparticles in the formulation. Certain aspects provide for dispersing the nanoparticles within a time (e.g., less than 12 hours) acceptable for commercial scale production of the formulation and the polishing pad. Implementations may beneficially increase nanoparticle loading (e.g. at least 50 weight percent) in the formulation, provide thermal stability of the dispersant and the formulation, avoid or reduce agglomerations of the nanoparticles in the formulation, and provide for decreased processing (sonication) time to disperse the nanoparticles in the monomer.

Implementations may have a parent formulation including monomer (e.g., acrylate or methacrylate monomers), nanoparticles (e.g., ceria nanoparticles), and a dispersant (e.g., a polyester derivative, Evonik 685, etc.). The additional components or additives may include crosslinkers, oligomers, surface energy modifiers, or rheology modifiers, or any combinations thereof. The parent formulation or solution may be utilized to disperse (e.g., via sonication and the dispersant) the nanoparticles into the monomer. After the sonication or dispersion, additional compounds or components may be added to the parent formulation to give a final formulation. The final or product formulation may be fed to the 3D printer. The final formulation may be the feed formulation for the additive manufacturing or 3D printer. The final formulation may be loaded into the 3D printer and ejected through nozzles of the 3D printer to form layers of the polishing pad.

In one implementation, the parent formulation is approximately 50 wt % ceria nanoparticles, 2.5 wt % Evonik 685, and 47.5 wt % monomer. In that particular implementation, the corresponding final formulation is approximately 70 wt % ceria nanoparticles, 2.5 wt % Evonik 685, and 27.5 wt % monomer.

In implementations, the parent formulation may have a weight percent of nanoparticles of at least 40, at least 50, at least 60, or at least 70, or in the weight-percent ranges of 40 to 70, 50 to 70, 60 to 70, 40 to 60, and 50 to 60, and so forth. The parent formulation may have a weight percent of monomer, for example, in ranges having a low end of 20, 25, 30, 35, 40, or 45, and a high end of 45, 50, 55, or 60, and so on. The parent formulation may have a weight percent of dispersant, for example, in the range of 1 to 10, or 1 to 5, or 2 to 4, and the like.

The final formulation may have a weight percent of nanoparticles of at least 30, at least 40, at least 50, or at least 60, or in the weight-percent ranges of 30 to 60, 35 to 60, 40 to 60, 45 to 60, 50 to 60, 30 to 55, 35 to 55, 40 to 55, 45 to 55, 30 to 50, 35 to 50, or 40 to 50, and so forth. The final formulation may have a weight percent of monomer, for example, in ranges having a low end of 20, 25, 30, 35, 40, or 45, and a high end of 45, 50, 55, or 60, and so on. The parent formulation may have a weight percent of dispersant, for example, in the range of 1 to 10, 1 to 8, 1 to 5, or 1 to 3, and the like.

Figure 1B:
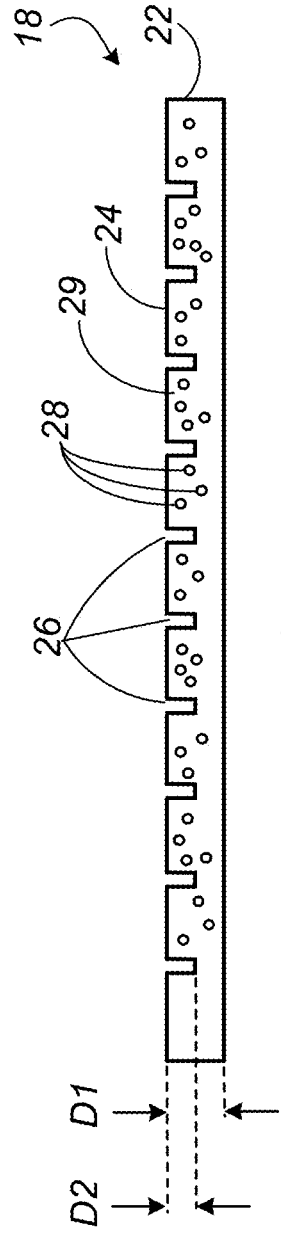
FIG. 1B is a schematic cross-sectional side view of another example polishing pad.
Figure 1C:
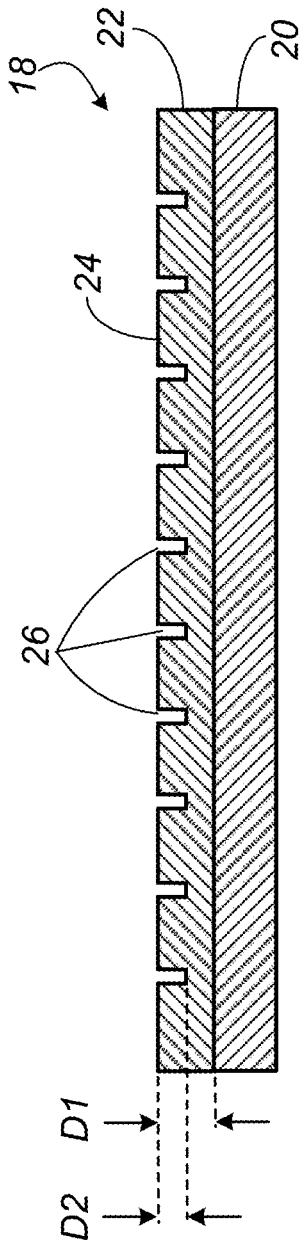
FIG. 1C is a schematic cross-sectional side view of yet another example polishing pad.

Referring to FIG. 1A-1C, a polishing pad 18 includes a polishing layer 22. As shown in FIG. 1A the polishing pad can be a single-layer pad that consists of the polishing layer 22, or as shown in FIG. 1C the polishing pad can be a multi-layer pad that includes the polishing layer 22 and at least one backing layer 20.

The polishing layer 22 can be a material that is inert in the polishing. The material of the polishing layer 22 can be a plastic, e.g., a polyurethane. In some implementations the polishing layer 22 is a relative durable and hard material. For example, the polishing layer 22 can have a hardness of about 40 to 80, e.g., 50 to 65, on the Shore D scale. The polishing layer 22 may be formed from a urethane acrylate oligomer.

As shown in FIG. 1A, the polishing layer 22 can be a layer of homogeneous composition, or as shown in FIG. 1B the polishing layer 22 can include abrasive particles 28 held in a matrix 29 of plastic material, e.g., polyurethane. The abrasive particles 28 are harder than the material of the matrix 29. The abrasive particles 28 can be from 0.05 weight percent (wt %) to 75 wt % of the polishing layer. For example, the abrasive particles 28 can be less than 1 wt % of the polishing layer 22, e.g., less than 0.1 wt %. Alternatively, the abrasive particles 28 can be greater than 10 wt % of the polishing layer 22, e.g., greater than 50 wt %. The material of the abrasive particles can be a metal oxide, such as ceria, alumina, or silica, or any combinations thereof. In certain implementations, the particles 28 are metal-oxide nanoparticles, such as ceria nanoparticles or silica nanoparticles. Moreover, in some implementations, the polishing layer includes pores, e.g., small voids. The pores can be 50-100 microns wide.

The polishing layer 22 can have a thickness D1 of 80 mils or less, 50 mils or less, or 25 mils or less. Because the conditioning process tends to wear away the cover layer, the thickness of the polishing layer 22 can be selected to provide the polishing pad 18 with a useful lifetime, e.g., 3000 polishing and conditioning cycles.

On a microscopic scale, the polishing surface 24 of the polishing layer 22 can have rough surface texture, e.g., a root mean squared (rms) surface-roughness of 2-4 microns. For instance, the polishing layer 22 can be subject to a grinding or conditioning process to generate the rough surface texture. In addition, 3D printing can provide small uniform features, e.g., down to 200 microns.

Although the polishing surface 24 can be rough on a microscopic scale, the polishing layer 22 can have good thickness uniformity on the macroscopic scale of the polishing pad itself. This uniformity may refer to the global variation in height of the polishing surface 24 relative to the bottom surface of the polishing layer, and does not count any macroscopic grooves or perforations deliberately formed in the polishing layer. The thickness non-uniformity can be less than 1 mil.

In some implementations, at least a portion of the polishing surface 24 can include a plurality of grooves 26 formed therein for carrying slurry. The grooves 26 may be of nearly any pattern, such as concentric circles, straight lines, a cross-hatched, spirals, and the like. In examples with grooves present, then on the polishing surface 24, the plateaus between the grooves 26 can be, for example, 25-90% of the total horizontal surface area of the polishing pad 18. Thus, the grooves 26 can occupy 10%-75% of the total horizontal surface area of the polishing pad 18. The plateaus between the grooves 26 can have a lateral width of about 0.1 to 2.5 mm.

In some implementations, e.g., if there is a backing layer 20, the grooves 26 can extend entirely through the polishing layer 22. In some implementations, the grooves 26 can extend through about 20-80%, e.g., at 40-60%, of the thickness of the polishing layer 22. The depth of the grooves 26 can be 0.25 to 1 mm. For example, in a polishing pad 18 having a polishing layer 22 that is 40-60 mils thick, e.g., 50 mils thick, the grooves 26 can have a depth D2 of about 15-25 mils, e.g., 20 mils.

The backing layer 20 can be softer and more compressible than the polishing layer 22. The backing layer 20 can have a hardness of 80 or less on the Shore A scale, e.g., a hardness of about 60 Shore A or less. The backing layer 20 can be thicker or thinner than (or the same thickness as) the polishing layer 22.

In certain implementations, the backing layer 20 can be an open-cell or a closed-cell foam, such as polyurethane or polysilicone with voids, so that under pressure the cells collapse and the backing layer compresses. Examples of material for the backing layer are PORON 4701-30 from Rogers Corporation, in Rogers, Conn., or SUBA-IV from Rohm & Haas. The hardness of the backing layer 20 can generally be adjusted by selection of the layer material and porosity. Alternatively, the backing layer 20 can be formed from the same precursor and have the same porosity as the polishing layer, but have a different degree of curing so as to have a different hardness.

Figure 2:
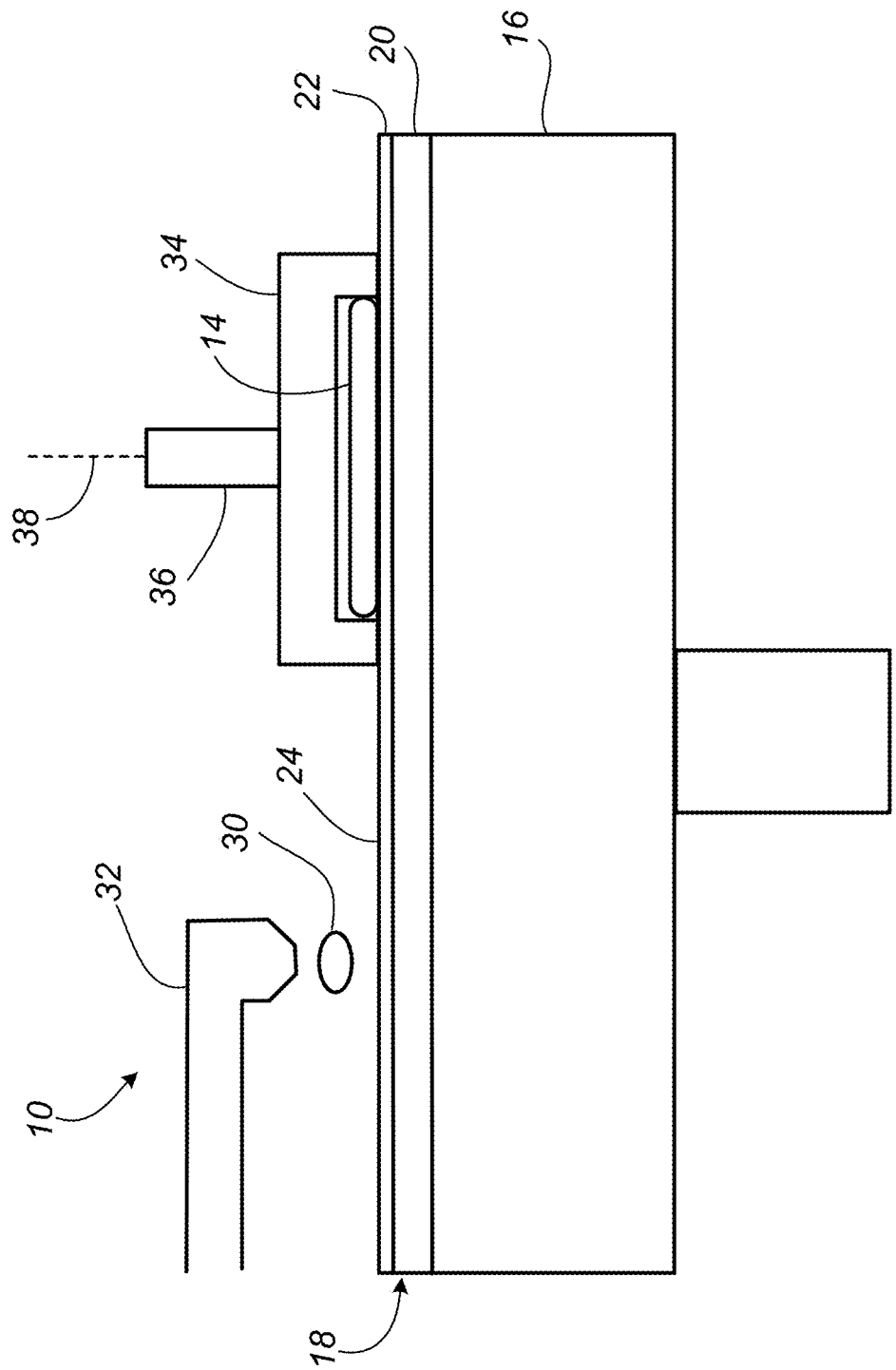
FIG. 2 is a schematic side view, partially cross-sectional, of a chemical mechanical polishing station.

Turning now to FIG. 2, one or more substrates 14 can be polished at a polishing station 10 of a CMP apparatus. A description of an applicable polishing apparatus can be found in U.S. Pat. No. 5,738,574, the entire disclosure of which is incorporated herein by reference.

The polishing station 10 can include a rotatable platen 16 on which is placed the polishing pad 18. During polishing, a polishing liquid 30, e.g., abrasive slurry, can be supplied to the surface of polishing pad 18 by a slurry supply port or combined slurry/rinse arm 32. The polishing liquid 30 can contain abrasive particles, a pH adjuster, or chemically active components. The polishing pad 18 may include nanoparticles, such as cerium (IV) oxide (CeO2) nanoparticles or silicon dioxide (SiO2) nanoparticles. If so, the polishing liquid 30 may generally not contain abrasive particles.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38. The relative motion of the polishing pad 18 and the substrate 14 in the presence of the polishing liquid 30 results in polishing of substrate 14.

Figure 3:
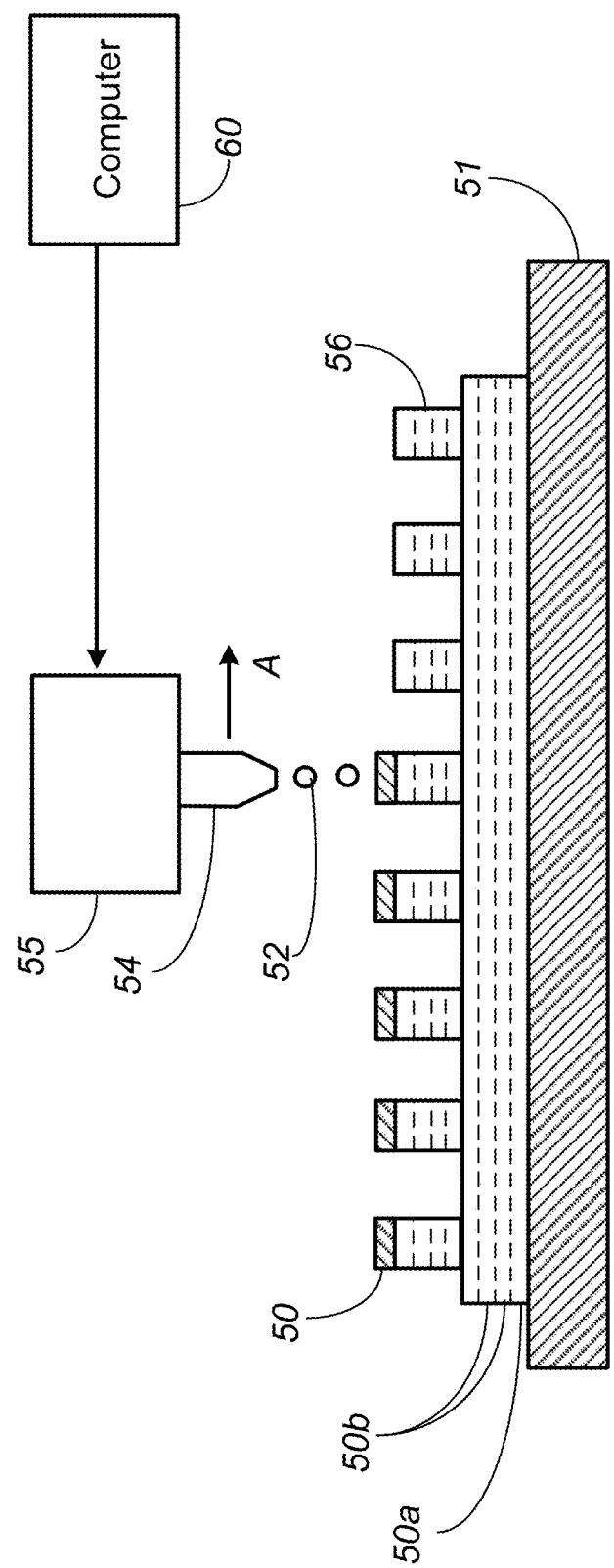
FIG. 3 is a schematic side view illustrating a substrate in contact with the polishing pad of FIG. 1A.

Referring to FIG. 3, at least the polishing layer 22 of the polishing pad 18 is manufactured utilizing 3D printing. In the manufacturing, thin layers of material are progressively deposited and fused. For example, droplets 52 of pad precursor material can be ejected from a nozzle 54 of a droplet ejecting printer 55 to form a layer 50. The droplet ejecting printer is similar to an inkjet printer, but employs the pad precursor material rather than ink. The nozzle 54 translates (shown by arrow A) across a support 51.

For a first layer 50a deposited, the nozzle 54 can eject onto the support 51. For subsequently deposited layers 50b, the nozzle 54 can eject onto the already solidified material 56. After each layer 50 is solidified, a new layer is then deposited over the previously deposited layer until the full 3-dimensional polishing layer 22 is fabricated. Each layer is applied by the nozzle 54 in a pattern stored in a 3D drawing computer program that runs on a computer 60. Each layer 50 is less than 50% of the total thickness of the polishing layer 22, e.g., less than 10%, e.g., less than 5%, e.g., less than 1%.

The support 51 can be a rigid base, or be a flexible film, e.g., a layer of polytetrafluoroethylene (PTFE). If the support 51 is a film, the support 51 can form a portion of the polishing pad 18. For example, the support 51 can be the backing layer 20 or a layer between the backing layer 20 and the polishing layer 22. Alternatively, the polishing layer 22 can be removed from the support 51.

Solidification can be accomplished by polymerization. For example, the layer 50 of pad precursor material can be a monomer, and the monomer can be polymerized in-situ by ultraviolet (UV) curing. The monomer may be, for example, (meth)acrylate monomers, and can include one or more mono(meth)acrylates, di(meth)acrylates, a tri(meth)acrylates, tetra(meth)acrylates, or a combination thereof. Examples of mono(meth)acrylates include isobornyl (meth) acrylate, cyclohexyl (meth)acrylate, trimethylcyclohexyl (meth)acrylate, diethyl (meth)acrylamide, dimethyl (meth) acrylamide, and tetrahydrofurfuryl (meth)acrylate. Monomers may serve as cross-linkers or other reactive compounds. Examples of cross-linkers include polyethylene glycol di(meth)acrylates (e.g., diethylene glycol di(meth) acrylate or tripropylene glycol di(meth)acrylate), N,N'-methylenebis(meth)acrylamides, pentaerythritol tri(meth) acrylates, and pentaerythritol tetra(meth)acrylates. Examples of reactive compounds include polyethylene glycol (meth)acrylates, vinylpyrrolidone, vinylimidazole, styrenesulfonate, (meth)acrylamides, alkyl(meth)acrylamides, dialkyl(meth)acrylamides), hydroxyethyl(meth)acrylate, morpholinoethyl acrylate, and vinylformamide. Nanoparticles may be dispersed in the monomer. The pad precursor material can be cured effectively immediately upon deposition, or an entire layer 50 of pad precursor material can be deposited and then the entire layer 50 be cured simultaneously. Nanoparticles may be dispersed in the monomer giving the nanoparticles embedded or residing in the cured monomer.

The 3D printing generally avoids the need for making molds, which can be relatively expensive and their use add time in the manufacturing. The 3D printing may eliminate several conventional-pad manufacturing steps, such as molding, casting, and machining. Additionally, tight tolerances can generally be achieved in 3D printing due to the layer-by-layer printing. Also, one printing system (with printer 55 and computer 60) can be employed to manufacture a variety of different polishing pads, simply by changing the pattern stored in the 3D drawing computer program in certain applications.

In some implementations, the backing layer 20 can also be fabricated by 3D printing. For example, the backing layer 20 and polishing layer 22 could be fabricated in an uninterrupted operation by the printer 55. The backing layer 20 can be provided with a different hardness than the polishing layer 22 by applying a different amount of curing, e.g., a different intensity of UV radiation.

In other implementations, the backing layer 20 is fabricated by a conventional process and then secured to the polishing layer 22. For instance, the polishing layer 22 can be secured to the backing layer 20 by a thin adhesive layer, e.g., as a pressure-sensitive adhesive.

The present techniques may utilize polyester derivatives to promote dispersing of nanoparticles in the monomer in the 3D printer formulation. The polyester derivatives may each have at least one ester block and at least one ether block. These polyester derivatives are utilized as a dispersant in formulations for 3D printing of a polishing layer of a polishing pad. The polyester derivatives may be thermally stable and as dispersants may provide for thermal stability of the formulation and nanoparticles (e.g., metal-oxide particles such as ceria nanoparticles). The present polyester derivatives may give an increased loading of nanoparticles in the formulation and with less dispersant utilized in the formulation. Moreover, the present dispersants may enable faster processing (sonication) to disperse the metal-oxide nanoparticles in the formulation. Lastly, utilizing polyester derivatives (having an ester block and an ether block) as a dispersant may beneficially avoid use of a surfactant or surfactant functionalization in the fabrication of the polishing pad.

Figure 4:
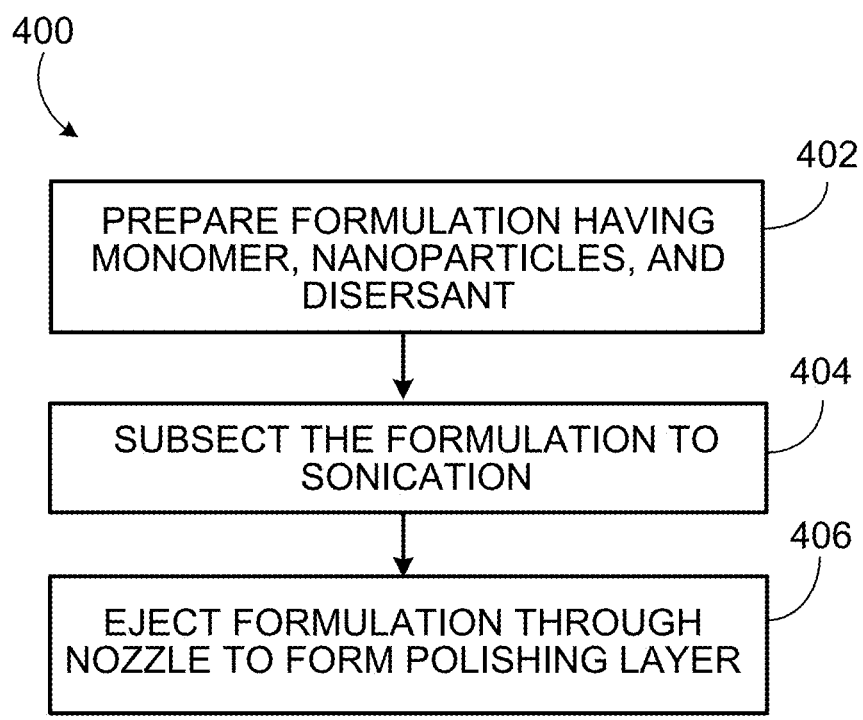
FIG. 4 is a block flow diagram of a method of fabricating a polishing pad.

FIG. 4 illustrates a method 400 of fabricating a polishing pad, such as a CMP pad. Initially, a formulation including a monomer, nanoparticles, and dispersant is prepared (402). In implementations, the nanoparticles may have particle size less than 200 nanometers (nm), or less than 100 nm, or in a range of 10 nm to 100 nm. The formulation is for additive manufacturing or 3D printing to form polishing layers of the polishing pad. To prepare the formulation, the nanoparticles and the dispersant may be added to the monomer. For example, the nanoparticles and dispersant may be added to the monomer in a vessel.

The dispersant may be a polyester derivative having at least one ester block and at least one ether block. The polyester derivative may be a cationic dispersant. The polyester derivative may have an acid value of at least 35 milligrams (mg) of potassium hydroxide (KOH) to neutralize one gram of the polyester derivative. The polyester derivative may be a modified polyester with ammonium (or phosphonium) cationic groups along the polyester backbone. The nanoparticles may be metal-oxide nanoparticles, such as cerium (IV) oxide (CeO2) (ceria) nanoparticles, silicon oxide (SiO2) (silica) nanoparticles, zirconium dioxide (ZrO2) (zirconia) nanoparticles, aluminum (III) oxide (Al2O3) (alumina) nanoparticles, titanium (IV) oxide (titanium dioxide) (TiO2) (titania) nanoparticles, and so on.

The formulation may be subjected (404) to sonication to disperse the metal-oxide nanoparticles throughout the monomer. Additionally, the sonication may break up aggregates of micron-sized colloidal particles. Sonication may be applied utilizing an ultrasonic bath or an ultrasonic probe. In an implementation, an ultrasonic probe is placed adjacent or in a vessel having the formulation to emit ultrasonic frequencies into the formulation to sonicate the formulation. The sonicating may be considered as preparation of the formulation.

Sonication can be performed by applying sound energy to agitate particles in a solution. Ultrasonic frequencies, e.g., greater than 20 kilohertz (kHz), may be employed to give the sonication. This process may be referred to as ultra-sonication or super-sonication. The term "super-sonication" may mean sonication performed at a frequency of at least 20 kHz.

Lastly, additional components may be added to the formulation having the dispersed nanoparticles. The inclusion of the additional components may also be characterized as preparing the formulation.

The formulation having the dispersed nanoparticles may be added (406) to a 3D printer. The formulation may be ejected through a nozzle(s) of the 3D printer to form a polishing layer of the polishing pad. The polishing layer may be cured, for example, with UV light. Multiple polishing layers may be formed to give the polishing pad.

Example

An implementation of the polyester derivatives (having both an ester block and ether block) is Evonik TEGO® Dispers 685 (hereinafter "Evonik 685") manufactured by Evonik Industries AG having headquarters in Essen, North Rhine-Westphalia, Germany. In general, Evonik 685 can be applied a polymeric wetting and dispersing additive for radiation-curing and solventborne formulations. Evonik 685 is a cationic dispersant having an acid value of at least 35 mg KOH and with cationic groups along the polyester backbone.

The present techniques may utilize Evonik 685 as a dispersant in formulations for 3D printing of a polishing layer of a polishing pad. Evonik 685 may provide for thermal stability, a large loading (e.g., up to 50 wt %) of metal-oxide nanoparticles in the formulation, less dispersant utilized in the formulation, and subsequently less CMP processing time with the finished CMP pad.

Evonik 685 was compared to the dispersant BYKJET™ 9152 (hereinafter "BYK 9152") manufactured by BYK Additives & Instruments having headquarters in Wesel, Germany. Two identical formulations having monomer and Ceria nanoparticles were prepared. Evonik 685 was added to one formulation and BYK 9152 was added to the other formulation. Both formulations were then subjected the same conditions of sonication.

To prepare the formulations, the dispersant was mixed with the monomer [isobornyl (meth)acrylate, cyclohexyl (meth)acrylate, trimethylcyclohexyl (meth)acrylate, diethyl (meth)acrylamide, dimethyl (meth)acrylamide, and tetrahydrofurfuryl (meth)acrylate] to a generally homogenous solution. Then, the ceria nanoparticles were added and the suspension loaded into a sonicator (ultrasonicator). The sonicator was Sonics VC 750 operated in the range of 20% to 100% of the sonicator power. The Sonics VC 750 is a 750-watt ultrasonic processor for processing material from 250 microliter to 1 liter. The Sonics VC 750 is available from Sonics & Materials, Inc. (headquarters in Newtown, Connecticut, USA).

The suspension solution was sonicated for the desired time (e.g., 12 hours). The particle size and viscosity were then checked. Particle size are measured by dynamic light scattering (DLS). During the sonication, DLS data was utilized to interpret aggregation and agglomeration of the particles. In particular, the breaking and releasing of single particles was construed via the DLS data. An acceptable or desirable dispersion may be generally achieved when the peak of DLS particle-size data approaches or matches the size of single particle. If the particle size and the viscosity met the respective targets, additional components were added to finalize the formulation. Additional components included crosslinkers, oligomers, surface energy modifiers, and rheology modifiers.

The viscosity of parent ink, i.e., the formulation prior to the inclusion of the additional components, with the Evonik 685 was 5.7 centipoise (cP) at 70° C. The parent ink had 50 wt % ceria nanoparticles, 2.5 wt % Evonik 685, and 47.5 wt % monomer. The viscosity of the final ink, i.e., the formulation after inclusion of the additional components, was in a range 13 cP to 14 cP tat 70° C.

As discussed below, the Evonik 685 in comparison to the BYK 9152 provided for less amount of dispersant utilized and greater dispersion of the ceria nanoparticles. The Evonik 685 is thermally stable and provides for thermal stability of the formulation. In addition, the Evonik 685 gives an acceptable loading of the ceria nanoparticles in the formulation. Moreover, utilizing the Evonik 685 as a dispersant may beneficially avoid use of a surfactant or surfactant functionalization.

Figure 5:
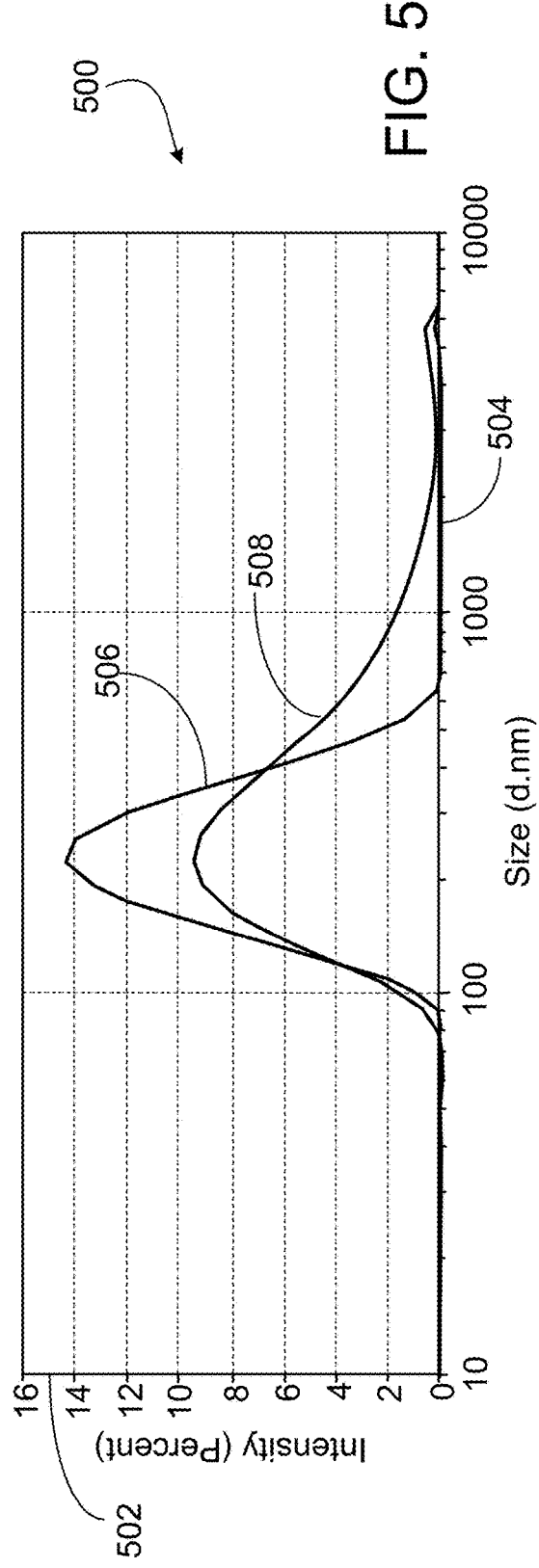
FIGS. 5-7 are dynamic light scattering (DLS) diagrams of intensity versus particle size.

FIG. 5 is a dynamic light scattering (DLS) plot 500 of intensity 502 (percent) versus particle size 504 (nm) for ceria nanoparticles in two formulations (e.g., parent formulations, as discussed). As mentioned, the formulations each included a dispersant and were subjected to sonication. The amount of Evonik 685 dispersant is less than the amount of BYK 9152 dispersant. The curve 506 is for the formulation having 5 wt % of Evonik 685. The curve 508 is for the formulation having 35 wt % of BYK 9152. Thus, as indicated by the DLS plot 500, the dispersing of the ceria nanoparticles with 5 wt % of Evonik 685 in the formulation is greater than the dispersing of the ceria nanoparticles with 35 wt % of BYK 9152 in the formulation.

Figure 6:
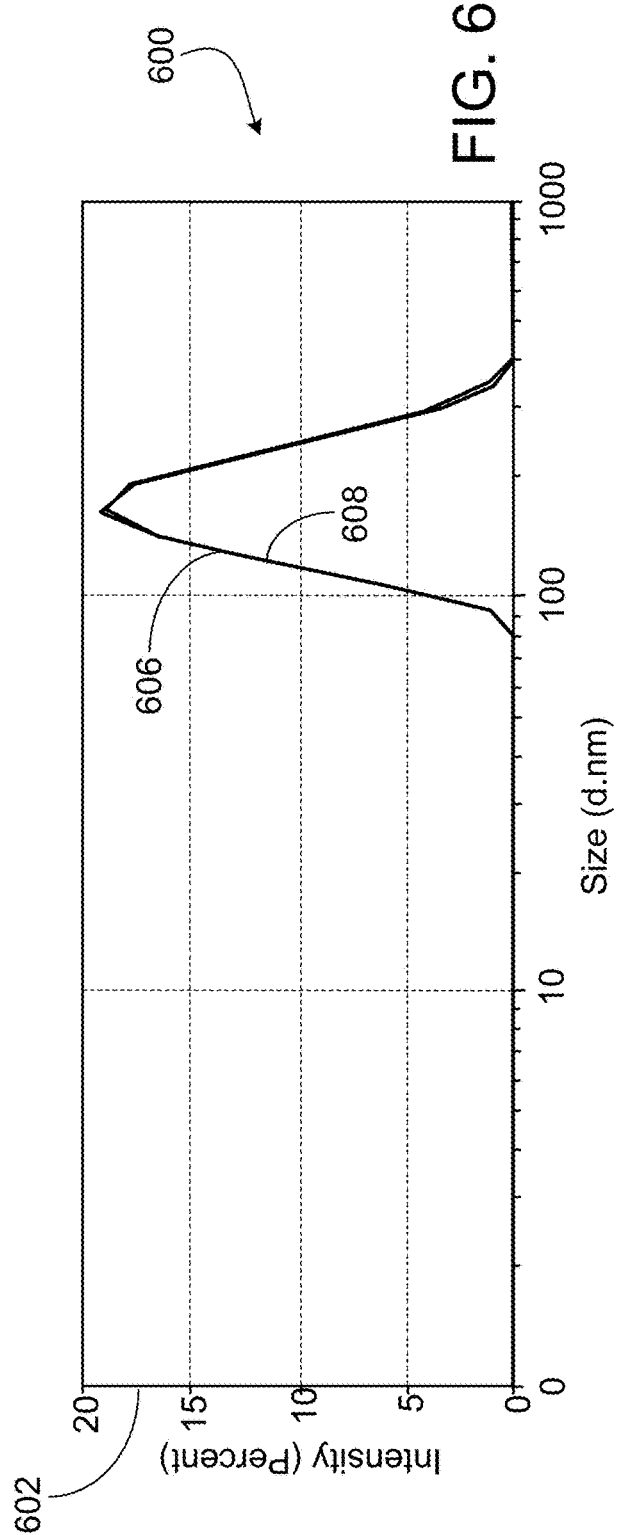

FIG. 6 is a DLS plot 600 of intensity 602 (percent) versus particle size 604 (nm) for ceria nanoparticles in the formulation having Evonik 685 as the dispersant. The curve 606 is for the formulation less than 1 hour after sonication. The curve 608 is for the formulation after the formulation has been held at 90° C. for 72 hours. The curve 608 is essentially superimposed on the curve 606. Thus, this thermal stability test indicated there is no significant difference in terms of particle size of the ceria nanoparticles before and after the formulation experienced 90° C. for 72 hours. Therefore, the Evonik 685 and the formulation with Evonik 685 may be characterized as having a robust thermal stability.

Figure 7:
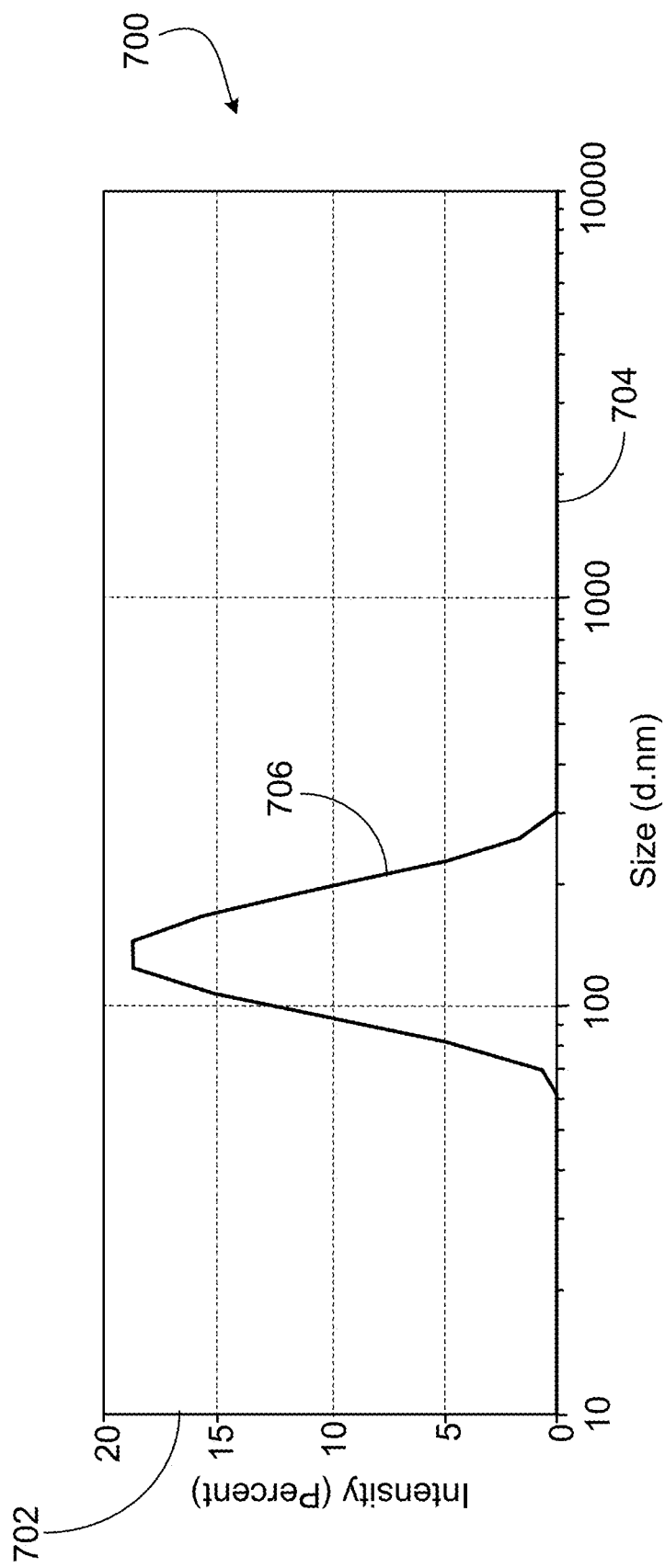

FIG. 7 is a DLS plot 700 of intensity 702 (percent) versus particle size 704 (nm) for ceria nanoparticles. The curve 706 is for a solvent with a loading (concentration) of 50 wt % ceria nanoparticles and having Evonik 685 as the dispersant, and after 12 hours of super-sonication. In particular, the solution had 100 grams (g) of ceria nanoparticles in 200 g of the solvent with 5 g of dispersant Evonik 685 and after 12 hours of super-sonication. With Evonik 685 as the dispersant, a higher loading of ceria is achieved and less processing time is required. As indicated by the curve 706, the particle distribution characterized by DLS matches with the size of a single particle. As can be appreciated DLS may show the size distribution of all particles and aggregations of particles in solution. Initially, there may be many peaks with their size over a range of microns. Peaks at a larger size than single particle size may be of aggregations of particles. As the aggregations are broken and dispersed in the sonication, these peaks at larger values may gradually disappear, leaving generally only the single particle peak.

Figure 8:
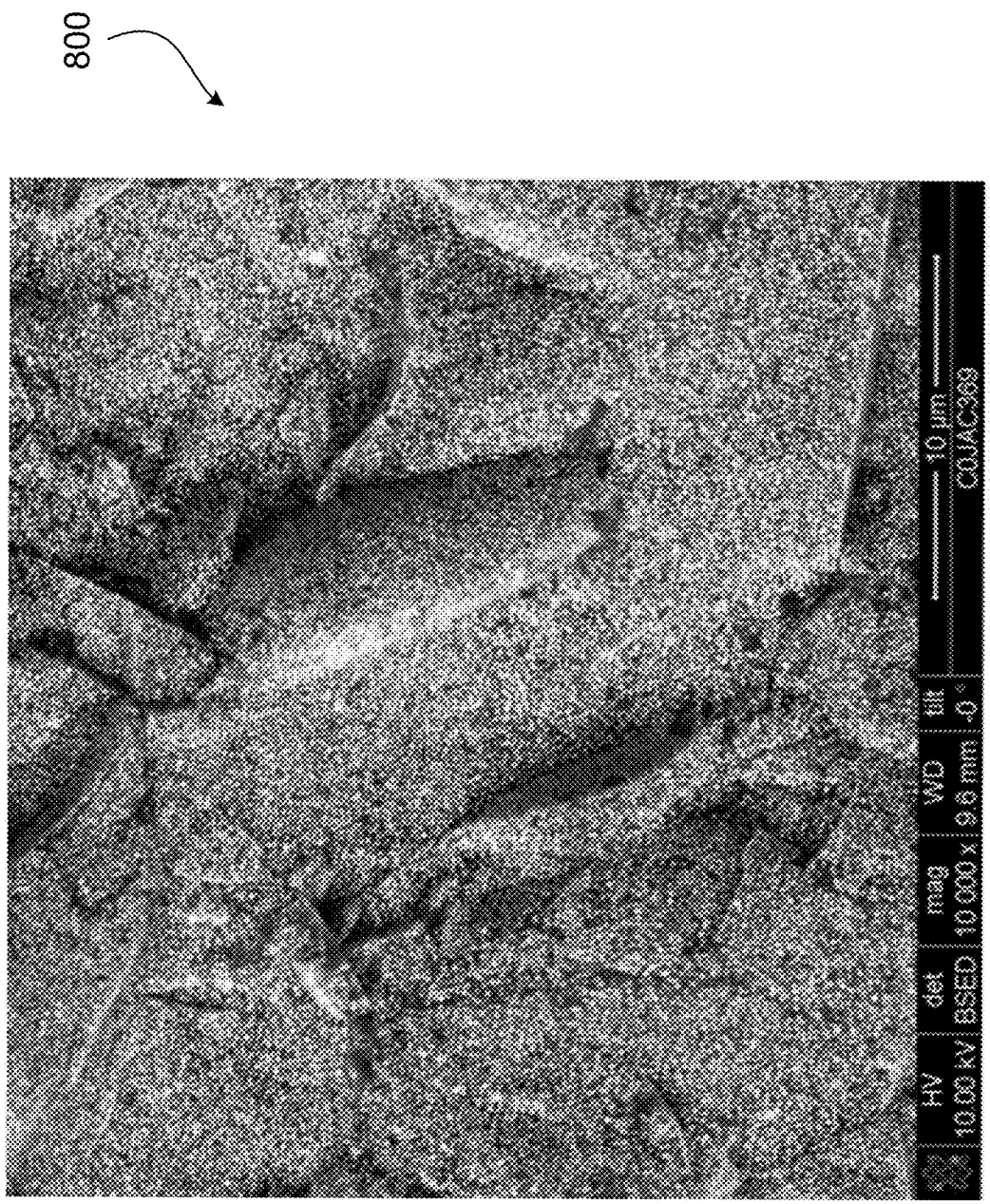
FIGS. 8-10 are scanning electron microscope (SEM) images.

FIG. 8 is a scanning electron microscope (SEM) image 800 of a cured formulation (ink) having monomer, ceria nanoparticles, and 5 wt % Evonik 685. The formulation was subjected to sonication prior to curing. As indicated by the SEM image 800, excessive agglomeration of the ceria nanoparticles was not observed.

Figure 9:
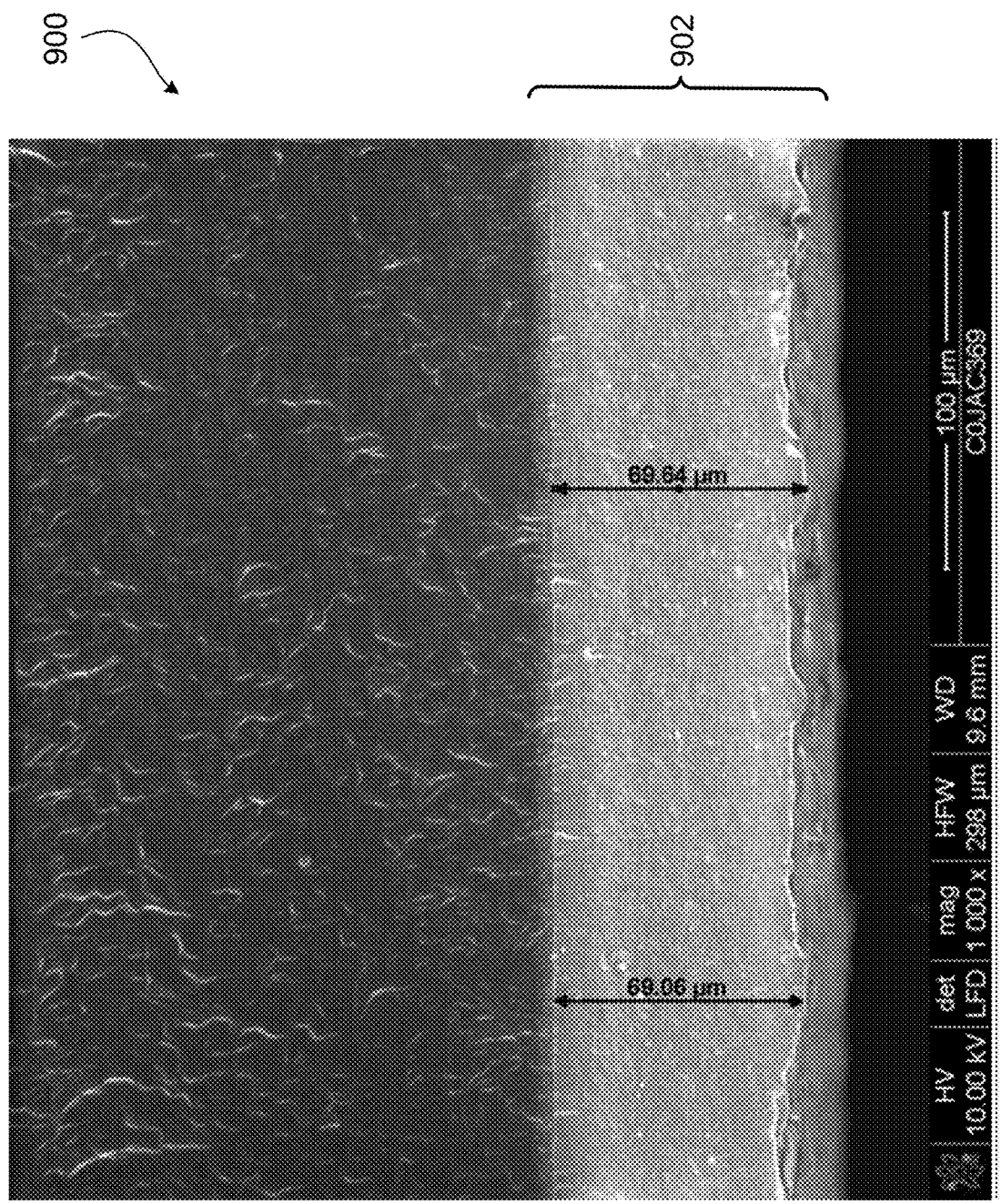

FIG. 9 is an SEM image 900 of a cross-section of a cured polishing pad formed with a formulation (ink) having mono-mer, ceria nanoparticles, and 5 wt % ceria nanoparticles. The formulation was subjected to sonication. The layer 902 contains ceria nanoparticles.

Figure 10:
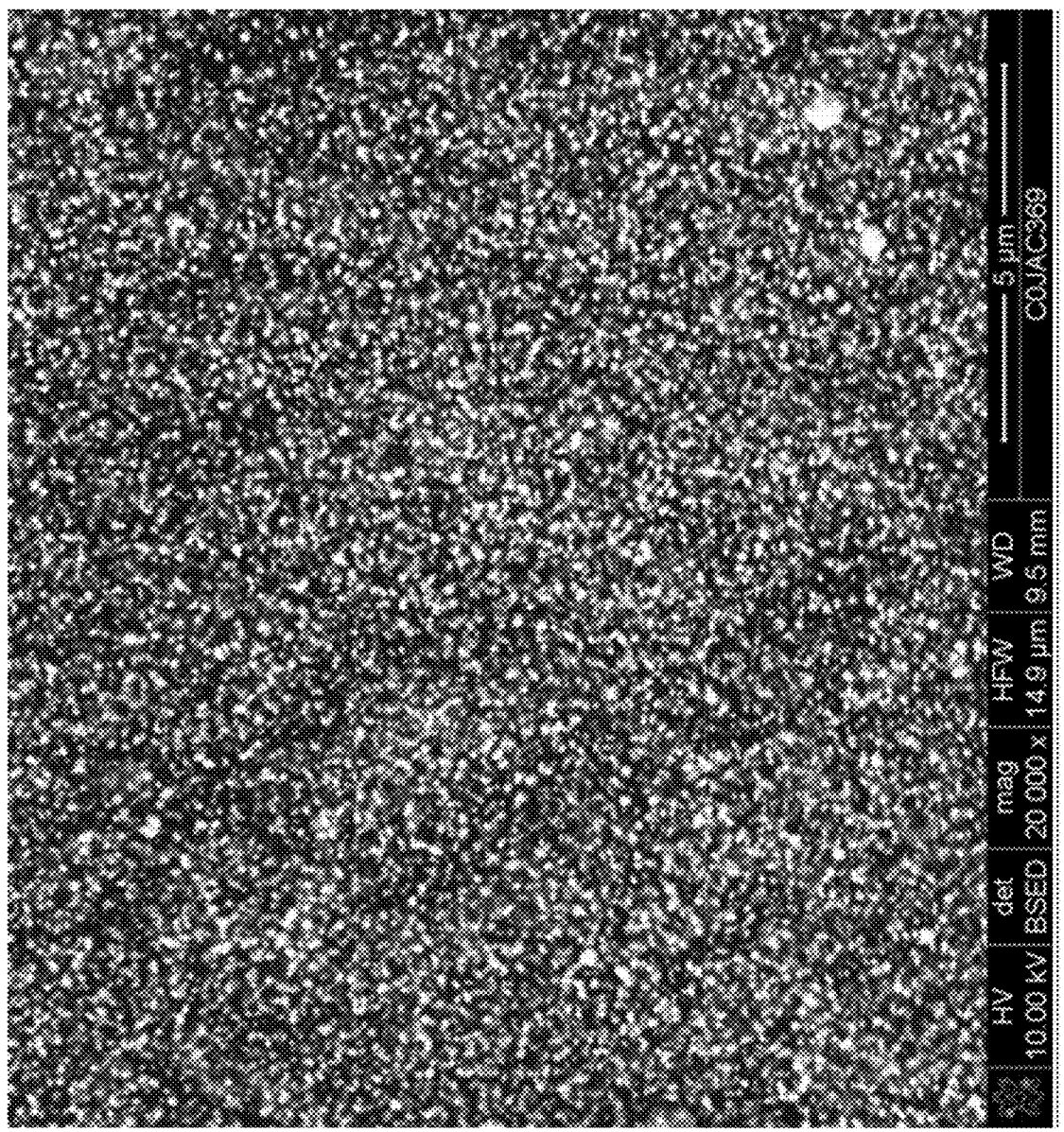

FIG. 10 is an SEM image 1000 that is a magnification of the SEM image 800 of FIG. 8. Again, significant agglomeration was not observed.

Polyester derivatives (having at least one ester block and at least one ether block), such as Evonik 685, as a dispersant can stabilize metal-oxide nanoparticles efficiently at a low loading (e.g., 5 wt %) of the dispersant in a formulation having the nanoparticles. The dispersion can be achieved via the dispersant and super-sonication. The resulting suspension is well-dispersed with the metal-oxide nanoparticles, as confirmed by DLS. In some implementations, no surfactants are utilized to stabilize the ceria nanoparticles. In certain instances, better or greater dispersion is achieved without surfactants.

Table 1 below gives the material removal rate (MRR) in nanometers per minute of a substrate (TEOS silicon oxide). TEOS is tetraethyl orthosilicate or tetraethoxysilane. The MRR values are for a given wt % of ceria nanoparticles in a CMP polishing pad utilized to remove the material. The CMP polishing pads were fabricated with a formulation including a monomer having Evonik 685.

TABLE 1

| Material Removal Rate (MRR) | |
|---|---|
| Ceria Nanoparticles (wt %) | MRR (nm/min) |
| 38.5 | 73 |
| 38.5 | 71 |
| 38.5 | 42 |
| 25 | 45 |
| 25 | 32 |
| 25 | 39 |
| 25 | 25 |

Implementations include a formulation for 3D printing of a polishing layer of a polishing pad. The formulation includes a parent formulation having monomer, a dispersant that is a polyester derivative, and nanoparticles dispersed in the parent formulation. The polyester derivative may have an ester block and an ether block. In one example, the dispersant is Evonik 685. The parent formulation (or parent ink) is initially prepared to disperse the nanoparticles in the parent formulation via sonication. The nanoparticles are typically metal-oxide nanoparticles and may be, for example, ceria nanoparticles or silica nanoparticles. In implementations, the dispersant is less than 6 wt % of the parent formulation and the nanoparticles are at least 45 wt % of the parent formulation. In some examples, the monomer is less than 50 wt % of the parent formulation. The monomer may be, for example, a methacrylate monomer. The viscosity of the parent formulation may be, for example, less than 8 cP at 70° C. To give the formulation as a final formulation for 3D printing, additional components may be added to the parent formulation having the dispersed nanoparticles. The additional components may include a crosslinker, an oligomer, a surface energy modifier, or a rheology modifier, or any combinations thereof. The viscosity of the formulation (e.g., the final formulation) with the additional components may be, for example, less than 17 cP at 70° C. The nanoparticles may be at least 25 wt % of the formulation utilized in the 3D printing. Also, in examples, the formulation does not have a surfactant.

Certain implementations are a method of preparing a formulation for additive manufacturing of a polishing pad (e.g., a CMP pad). The method includes adding a dispersant that is a polyester derivative to monomer. The polyester derivative may have an ester block and an ether block. Further, the method includes adding metal-oxide nanoparticles (e.g., ceria nanoparticles) to the monomer and subjecting the monomer having the nanoparticles and dispersant to sonication (e.g., for less than 15 hours) to disperse the nanoparticles in the monomer. In instances, the nanoparticles are not subjected to surfactant functionalization. In certain examples, the dispersant is less than 10 wt % of the formulation and the nanoparticles as dispersed are at least 40 wt % of the formulation.

Some implementations are a method of fabricating a polishing pad. The method includes ejecting droplets of a formulation via a 3D printer to form a polishing layer of the polishing pad. The formulation includes monomer, nanoparticles (e.g., ceria nanoparticles) dispersed in the monomer, and a dispersant that is a polyester derivative having an ester block and an ether block. In examples, the dispersant is less than 6 wt % of the formulation and the formulation does not include a surfactant. The nanoparticles may be at least 25 wt % of the formulation. In certain instances, the viscosity of the formulation is less than 17 cP at 70° C. The method includes polymerizing the monomer as ejected to form the polishing layer having the nanoparticles. The nanoparticles may be at least 25 wt % of the polishing layer.

A number of implementations have been described. Nevertheless, it will be understood that various modifications may be made without departing from the spirit and scope of the disclosure. For example, either the polishing pad, or the carrier head, or both can move to provide relative motion between the polishing surface and the substrate. The polishing pad can be a circular or some other shape. An adhesive layer can be applied to the bottom surface of the polishing pad to secure the pad to the platen, and the adhesive layer can be covered by a removable liner before the polishing pad is placed on the platen. In addition, although terms of vertical positioning are used, it should be understood that the polishing surface and substrate could be held upside down, in a vertical orientation, or in some other orientation. Accordingly, other implementations are within the scope of the following claims.

What is claimed is:

1. A formulation for three dimensional (3D) printing of a polishing layer of a polishing pad, comprising:
    a parent formulation comprising:
        monomer;
        a dispersant comprising a polyester derivative; and
        nanoparticles dispersed in the parent formulation, wherein the dispersant is less than 6 weight percent of the parent formulation, and wherein the nanoparticles are at least 45 weight percent of the parent formulation.

2. The formulation of claim 1, wherein the nanoparticles comprise ceria nanoparticles.

3. The formulation of claim 1, wherein the nanoparticles comprise silica nanoparticles.

4. The formulation of claim 1, wherein the monomer comprises a methacrylate monomer.

5. The formulation of claim 1, wherein viscosity of the parent formulation is less than 8 centipoise (cP) at 70° C.

6. The formulation of claim 1, wherein the formulation further comprises a crosslinker, an oligomer, a surface energy modifier, or a rheology modifier, or any combinations thereof.

7. The formulation of claim 6, wherein viscosity of the formulation is less than 17 centipoise (cP) at 70° C.

8. The formulation of claim 6, wherein the nanoparticles comprise cerium (IV) oxide ($CeO_2$) nanoparticles, and wherein the nanoparticles are at least 25 weight percent of the formulation.

9. The formulation of claim 6, wherein the formulation does not comprise a surfactant.

10. A formulation for three dimensional (3D) printing of a polishing layer of a polishing pad, comprising:
    a parent formulation comprising:
        monomer;
        a dispersant comprising a polyester derivative; and
        nanoparticles dispersed in the parent formulation, wherein the monomer is less than 50 weight percent of the parent formulation.

11. A formulation for three dimensional (3D) printing of a polishing layer of a polishing pad, comprising:
    a parent formulation comprising:
        monomer;
        a dispersant comprising a polyester derivative; and
        nanoparticles dispersed in the parent formulation, wherein the nanoparticles comprise metal-oxide nanoparticles, and wherein the polyester derivative comprises an ester block and an ether block.

12. A method of fabricating a polishing pad, comprising:
    ejecting droplets of a formulation via a three-dimensional (3D) printer to form a polishing layer of the polishing pad, wherein the formulation comprises monomer, nanoparticles dispersed in the monomer, and a dispersant comprising a polyester derivative; and
    polymerizing the monomer as ejected to form the polishing layer, wherein the polishing layer comprises the nanoparticles, wherein the nanoparticles comprise ceria nanoparticles, and wherein the polyester derivative comprises an ester block and an ether block.

13. The method of claim 12, wherein the dispersant comprises less than 6 weight percent of the formulation.

14. The method of claim 12, wherein the formulation does not comprise a surfactant.

15. The method of claim 12, wherein the formulation comprises a crosslinker, an oligomer, a surface energy modifier, or a rheology modifier, or any combinations thereof, and wherein viscosity of the formulation is less than 17 centipoise (cP) at 70° C.

16. The method of claim 12, wherein the nanoparticles comprise at least 25 weight percent of the formulation.

* * * * *